United States Patent [19]
Schindler et al.

[11] 3,720,677
[45] March 13, 1973

[54] 4-(THIENO[2,3-B][1,5]BENZOTHIAZEPIN-4-YL)-PIPERAZINYL-ALKYL-3-ALKYL-2-IMIDAZOLIDINONES AS CNS-DEPRESSANTS

[75] Inventors: Walter Schindler, Riehen/Basel-land; Erich Schmid, Basel; Armin Zuest, Birsfelden/Basel-land, all of Switzerland

[73] Assignee: Ciba-Geigy Corporation, Ardsley, N.Y.

[22] Filed: Aug. 5, 1970

[21] Appl. No.: 61,511

[30] Foreign Application Priority Data

Aug. 11, 1969 Switzerland...................12125/69

[52] U.S. Cl..............................260/268 TR, 424/250
[51] Int. Cl..............................................C07d 51/70
[58] Field of Search......260/268 TR, 243 A, 243 AN

[56] References Cited

UNITED STATES PATENTS

| 3,646,037 | 2/1972 | Schindler et al............260/268 TR |
| 3,646,039 | 2/1972 | Schindler et al............260/268 TR |
| 3,478,022 | 11/1969 | Renz........................260/268 TR |
| 3,320,247 | 5/1967 | Arnold et al..............260/268 C |
| 3,474,099 | 10/1969 | Renz et al................260/268 C |

*Primary Examiner*—Donald G. Daus
*Attorney*—Karl F. Jorda and Bruce M. Collins

[57] ABSTRACT

Compounds of the class of 1-[2-[4-(thienol[2,3-b][1,5]]-1-piperazinyl]-alkyl]-3-alkyl-2-imidazolidinones and their pharmaceutically acceptable acid addition salts have a depressant effect on the central nervous system; pharmaceutical compositions comprising such compounds and methods of producing a central nervous system depressant effect therewith are provided; a typical embodiment is 1-[2-[4-(thieno[2,3-b][1,5]benzothiazepin-4-yl)-1-piperazinyl]-ethyl]-3-methyl-2-imidazolidinone.

2 Claims, No Drawings

4-(THIENO[2,3-B][1,5]BENZOTHIAZEPIN-4-YL)-PIPERAZINYL-ALKYL-3-ALKYL-2-IMIDAZOLIDINONES AS CNS-DEPRESSANTS

DETAILED DESCRIPTION

The present invention relates to new imidazolidinone derivatives, to processes for their production, to pharmaceutical compositions containing the new compounds, and to the use thereof.

More particularly, the present invention relates to compounds of formula I,

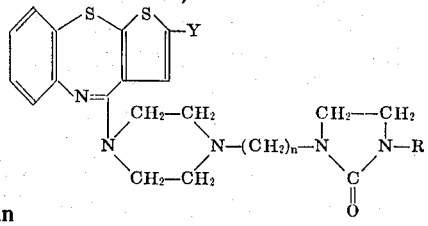

wherein

R is lower alkyl having one to four carbon atoms;
n is the integer 2 or 3; and
Y is hydrogen or chloro;
and the pharmaceutically acceptable addition salts thereof.

It has now been found that such compounds, especially 1-[2-[4-(thieno[2,3-b][1,5]benzothiazepin-4-yl)-1-piperazinyl]-ethyl]-3-methyl-2-imidazolidinone, as well as the pharmaceutically acceptable acid addition salts thereof, possess valuable pharmacological properties, and have a high therapeutic index. In the case of oral, rectal or parenteral administration, they have a central depressant action, e.g., they reduce motility, potentiate the effect of anaesthetics, inhibit conditioned reactions, have an anti-emetic and hypothermal action, have an inhibiting effect in the "test de la traction," and reduce the aggressive behavior of fighting mice. Furthermore, they have an adrenolytic and serotonin-antagonistic action. These properties, which are determined by means of selected standard tests [cp. R. Domenjoz and W. Theobald, Arch.Int.Pharmacodyn. 120, 450 (1959) and W. Theobald et al., Arz-neimittelforschung 17, 561 (1967)], characterize the compounds as being suitable for the treatment of states of tension and agitation and of psychosomatic disturbances.

As a lower alkyl group in the compounds of formula I, R can be, e.g., the methyl, ethyl, propyl, isopropyl, butyl, isobutyl, sec.butyl or the tert.butyl group.

A compound of formula I is produced according to the invention by reacting a compound of formula II,

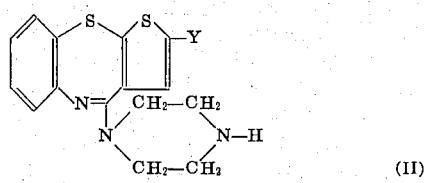

wherein Y has the meaning given under formula I, or an alkali metal derivative of such a compound, with a reactive ester of a compound of formula III,

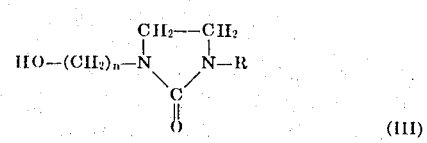

wherein R and n have the meaning given under formula I; and, optionally, converting the reaction product with an inorganic or organic acid into an addition salt.

Suitable reactive esters of compounds of formula III are, e.g., halides, such as chlorides or bromides, also sulphonic acid esters, e.g., methanesulphonic acid ester, or o- or p-toluene-sulphonic acid esters.

These esters are reacted with the free bases II preferably in the presence of a solvent. Suitable solvents are those which are inert under the reaction conditions, e.g., hydrocarbons such as benzene, toluene or xylene; halogenated hydrocarbons such as chloroform; ethereal liquids such as ether or dioxane; as well as lower alkanones such as acetone, methyl ethyl ketone, or diethyl ketone. The reaction temperatures are between ca. 50°–150°, preferably at the boiling point of the applied solvent.

In the reaction according to the invention of one molecular equivalent of reactive ester with one molecular equivalent of free base, one molecular equivalent of acid is split off. This acid can be bound to excess base of formula II, or to the dibasic reaction product. An acid-binding agent is, however, preferably added to the reaction mixture. Suitable acid-binding agents are, e.g., alkali metal carbonates such as sodium or potassium carbonate, also tertiary organic bases such as, e.g., pyridine, triethylamine or N,N-diisopropylethylamine. Excess tertiary bases can also be used as solvent.

If in the reaction according to the invention is used, instead of the free base of formula II, an alkali metal derivative thereof, e.g., a sodium, potassium or lithium derivative, then it is advantageous for the reaction to be performed in a hydrocarbon, e.g., in benzene or toluene.

The formation of the alkali metal derivatives of the first reactant is preferably performed in situ, e.g., by the addition of at least one molecular equivalent of alkali metal hydride, alkali metal amide, or of an alkali metal organic compound, when initially one molecular equivalent of free base is used. For example, sodium amide and lithium amide are used as alkali metal amides; sodium hydride as alkali metal hydrides; and phenyl lithium or butyl lithium as alkali metal organic compound.

Of the starting materials of formula II, 4-(1-piperazinyl)-thieno[2,3-b][1,5]benzothiazepine can be obtained e.g., as follows: Starting with 4-chlorothieno[2,3-b]-[1,5]benzothiazepine, this is condensed in benzene with 1-piperazinecarboxylic acid ethyl ester to 4-(thieno[2,3-b][1,5]benzothiazepin-4-yl)-piperazine-1-carboxylic acid ethyl ester; the condensation product is subsequently hydrolyzed and decarboxylated by heating with potassium hydroxide in ethanol. Further starting materials of formula II can be produced analogously.

The second reactant of the process according to the invention are the reactive esters of compounds of formula III. Of these compounds, for example, 1-(2-chloroethyl- and 1-(3-chloropropyl-3-methyl-2-imidazolidinone and 1-(2-chloroethyl)-3-butyl-2-imidazolidinone are known, and can be produced by various processes. Further compounds of this type can be produced analogously.

Using a second process according to the invention, compounds of formula I, wherein the symbol n denotes 2, are obtained by reacting a compound of formula II, wherein Y has the meaning given under formula I, or an alkali metal derivative of such a compound, with a compound of formula IV,

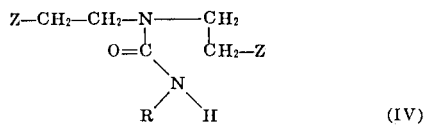

wherein
Z represents halogen,
and R has the meaning given under formula I, or with an alkali metal derivative of such a compound; and, optionally, converting the reaction product with an inorganic or organic acid into an addition salt.

As halogen, the radical Z of formula IV is preferably chlorine or bromine.

The reaction according to the invention of the free bases of formula II, or of their alkali metal derivatives, with the urea derivatives, or with their alkali metal derivatives, may be performed in the same solvents or diluents, and at the same reaction temperatures, as in the first process. In the reaction of one molecular equivalent of free base with one molecular equivalent of free urea derivative, two molecular equivalents of hydrogen halide are split off, which can also be bound to the same acid-binding agents. Both reactants are used as alkali metal derivatives, e.g., as sodium, potassium or lithium derivatives, preferably in situ, in the process according to the invention. These alkali metal derivatives can be obtained analogously to the alkali metal derivatives of the first process.

The production of the starting materials of formula II is described following the first process. A starting material which is embraced by formula IV is 1-methyl-3,3-bis-(2-chloroethyl)-urea which can be obtained, e.g., starting with diethanolamine. With 1-methylisocyanate, the diethanolamine yields 1-methyl-3,3-bis-(2-hydroxyethyl)-urea, which reacts with thionyl chloride, whereby sulphur dioxide and hydrogen chloride are split off. Further starting materials of formula IV can be produced analogously. Using a third process according to the invention, a compound of formula V:

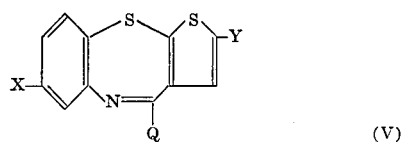

wherein Y has the meaning given under formula I, and
Q represents the radical of a reactive ester, an alkoxy-or an alkylthio group or an activated alkoxy-or alkyl-thio group,
is reacted with a compound of formula VI:

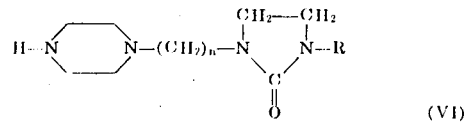

wherein R and n have the meaning given under formula I, or with an alkali metal derivative of such a compound; and, optionally, converting the obtained reaction product with an inorganic or organic acid into an addition salt.

Radicals of suitable reactive esters of compounds of formula V are, e.g., halides, such as chlorides or bromides, also sulphonic acid esters such as methanesulphonic acid ester, o- or p-toluenesulphonic acid esters, or o-chloro- or p-chlorobenzenesulphonic acid esters.

As lower alkoxy- or alkylthio group, the meaning of Q in the general formula V is preferably the methoxy- or ethoxy group or the methylthio- or ethylthio group respectively; as an activated alkoxy- or alkylthio group Q represents preferably the o-nitrobenzyloxy- or p-nitrobenzyloxy group or the o-nitrobenzylthio- or p-nitrobenzylthio group.

The reaction according to the invention of the free bases, or of their alkali metal derivatives, with the reactive esters can be performed in the same solvents or diluents, and at the same reaction temperatures, as in the first process. With the reaction of one molecular equivalent of free base with one molecular equivalent of reactive ester, one molecular equivalent of acid is split off, which can be bound to the same acid-binding agents as in the first process.

Instead of the free bases, it is also possible to use their alkali metal derivatives, e.g., sodium, potassium or lithium derivatives, preferably in situ, in the process according to the invention. These alkali metal derivatives can be obtained analogously to the alkali metal derivatives of the first process.

Starting materials: A compound of the general formula V, 4-chloro-thieno[2,3-b][1,5]benzothiazepin, is described in the literature. Further compounds of this type can be produced analogously.

A further starting material of the general formula V is the 2,4-dichloro-thieno[2,3-b][1,5]benzothiazepin which is obtained as follows:

The compound 2-chloro-5-mercaptothiophene is condensed with 1-chloro-2-nitro-benzene in the presence of sodium hydroxide yielding the 2-(o-nitrophenylthio)-5-chlorothiophene which is reduced to the corresponding o-amino compound by means of iron and diluted hydrochloric acid. By reaction with phosgene the said o-amino compound gives the crude 2-(o-isocyanato-phenylthio)-5-chlorothiophene, which is cyclized by means of aluminum chloride to the 2-chloro-thieno[2,3-b][1,5]benzothiazepin-4(5H)-one, which is converted by subsequent reaction with phosphorous pentachloride into the corresponding 2,4-dichloro-compound of the cyclic lactam.

The 2-alkoxy- or 2-alkylthio-derivatives of 4-chlorothieno[2,3-b][1,5]benzothiazepine may be prepared in an analogous manner.

Furthermore, as representative of compounds of the general formula VI are known, e.g., 1-[2-(1-piperazinyl)-ethyl]-3-methyl-2-imidazolidinone, 1-[3-(1-piperazinyl)-propyl]-3-methyl-2-imidazolidinone, as well as the corresponding 3-ethyl compounds; they can be produced by various methods. Further compounds of this type can be obtained analogously.

The compounds of formula I obtained by the processes according to the invention are, optionally, subsequently converted in the usual manner into their addition salts with inorganic and organic acids. For example, to a solution of a compound of formula I in an organic solvent is added the acid desired as salt component, or a solution of the acid. Preferably chosen for the reaction are organic solvents, in which the formed salt is difficultly soluble, so that it can be separated by filtration. Such solvents are, e.g., methanol, acetone, methyl ethyl ketone, acetone/ethanol, methanol/ether or ethanol/ether.

It is possible to use as medicaments, instead of free bases, pharmaceutically acceptable acid addition salts, i.e., salts with such acids of which the anions are not toxic in the case of the dosage amounts in question. It is moreover of advantage if the salts to be used as medicaments crystallize well and are not, or only slightly, hygroscopic. For salt formation with compounds of formula I it is possible to use, e.g., hydrochloric acid, hydrobromic acid, sulphuric acid, phosphoric acid, methane sulphonic acid, ethane sulphonic acid, 2-hydroxyethanesulphonic acid, acetic acid, malic acid, tartaric acid, citric acid, lactic acid, oxalic acid, succinic acid, fumaric acid, maleic acid, benzoic acid, salicyclic acid, phenylacetic acid, mandelic acid and embonic acid.

As previously mentioned, the new active substances are administered orally, rectally or parenterally. The dosage depends on the manner of administration, on the species, on the age, and on the individual condition. The daily dosages of the free bases, or of pharmaceutically acceptable salts thereof, vary between 0.15 mg/kg and 10.5 mg/kg for warm-blooded animals. Suitable dosage units such as dragees, tablets, suppositories or ampoules, preferably contain 5–200 mg of an active substance according to the invention.

Dosage units for oral administration contain as active substance preferably between 10 and 90 percent of a compound of formula I, or of a pharmaceutically acceptable salt thereof. They are produced by combining the active substance, e.g., with solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate, or polyethylene glycols, to form tablets or dragee cores. The dragee cores are coated, e.g., with concentrated sugar solutions which can also contain, e.g., gum arabic, talcum and/or titanium dioxide; or with a lacquer dissolved in readily volatile organic solvents or mixtures of solvents. Dyestuffs can be added to these coatings, e.g., to distinguish between varying dosages of active substance.

Further dosage units suitable for oral administration are hard gelatine capsules, as well as soft closed capsules made from gelatine and a softener, such as glycerin. The hard capsules preferably contain the active substance as a granulate, e.g., in admixture with fillers such as maize starch, and/or lubricants such as talcum or magnesium stearate, and optionally stabilizers such as sodium metabisulphite ($Na_2S_2O_5$), or ascorbic acid. In soft capsules, the active substance is preferably dissolved or suspended in suitable liquids such as polyethylene glycols, whereby stabilizers may also be added.

Suitable dosage units for rectal administration are, e.g., suppositories consisting of a combination of an active substance with a suppository base material. Suitable suppository base materials are, e.g., natural or synthetic triglycerides, paraffin hydrocarbons, polyethylene glycols, or higher alkanols. Also suitable are gelatine rectal capsules consisting of a combination of the active substance with a base material. Suitable as a base material are, e.g., liquid triglycerides, polyethylene glycols, or paraffin hydrocarbons.

Ampoules for parenteral adminstration, especially intramuscular administration, preferably contain a water-soluble salt of an active substance in a concentration of preferably 0.5 – 5 percent, optionally together with suitable stabilizers and buffer substances, in aqueous solution.

The following prescriptions further illustrate the production of tablets, dragees, capsules, suppositories and ampoules:

a. 250 g of 1-[2-[4-(thieno[2,3-b][1,5]benzothiazepin-4-yl)-1-piperazinyl]-ethyl]-3-methyl-2-imidazolidinone are mixed with 175.80 g of lactose and 169.70 g of potato starch; the mixture is then moistened with an alcoholic solution of 10 g of stearic acid, and granulated through a sieve. After the granulate has dried, 160 g of potato starch, 200 g of talcum, 2.50 g of magnesium stearate and 32 g of colloidal silicon dioxide are mixed in; the mixture is afterwards pressed into 10,000 tablets each weighing 100 mg and each containing 25 mg of active substance. These tablets can, if required, be provided with grooves for a more precise adjustment of the dosage amount.

b. A granulate is produced from 250 g of 1-[2-[4-(thieno[2,3-b][1,5]benzothiazepin-4-yl)-1-piperazinyl]-ethyl]-3-methyl-2-imidazolidinone-dihydrochloride, 175.90 g of lactose and the alcoholic solution of 10 g of stearic acid. After the granulate has been dried, it is mixed with 56.60 g of colloidal silicon dioxide, 165 g of talcum, 20 g of potato starch and 2.50 g of magnesium stearate; the mixture is then pressed into 10,000 dragee cores. These are subsequently coated with a concentrated syrup made from 502.28 g of crystallized saccharose, 6 g of shellac, 10 g of gum arabic, 0.22 g of dyestuff, and 1.5 g of titanium dioxide; and dried. The obtained dragees each weigh 120 mg and each contain 25 mg of active substance.

c. To produce 1000 capsules each containing 25 mg of active substance, 25 g of 1-[2-[4-(thieno[2,3-b][1,5]benzothiazepin-4-yl)-1-piperazinyl]-ethyl]-3-methyl-2-imidazolidinone are mixed with 248.0 g of lactose; the mixture is evenly moistened with an aqueous solution of 2.0 g of gelatine, and then granulated through a suitable sieve (e.g., sieve III, Ph.Helv. V). The granulate is mixed with 10.0 g of dried maize starch and 15.0 g of talcum; and the mixture is then evenly filled into 1000 hard gelatine capsules, size 1.

d. A suppository base mixture is prepared from 2.5 g of 1-[2-[4-(thieno[2,3-b][1.5]benzothiazepin-4-yl)-1-piperazinyl]-ethyl]-3-methyl-2-imidazolidinone and 167.5 g of adeps solidus; the mixture is then filled into 100 suppositories each containing 25 mg of active substance.

e. A solution of 25 g of 1-[2-[4-(thieno[2,3-b][1,5]benzothiazepin-4-yl)-1-piperazinyl]-ethyl]-3-methyl-2-imidazolidinone-dihydrochloride in one liter of water is filled into 1000 ampoules, and sterilized. An ampoule contains a 2.5 percent solution of 25 mg of active substance.

The following examples further illustrate the production of the new compounds of formula I, and of intermediate products not described hitherto; but the examples in no way limit the scope of the invention. The temperatures are given in degrees Centigrade.

EXAMPLE 1

*a.* A suspension of 12 g (0.040 moles) of 4-[1-piperazinyl)-thieno[2,3-b][1,5]benzothiazepine, 8.8 g (0.040 moles) of 1-(3-chloropropyl)-3-butyl-2-imidazolidinone, 2.5 g (0.018 moles) of potassium carbonate, and 0.5 g (0.0003 moles) of sodium iodide in 80 ml of diethyl ketone is refluxed for 24 hours. The reaction mixture is cooled, and filtered under suction; the precipitate is afterwards washed with acetone, and the filtrate concentrated in vacuo. The residue is taken up in ethyl acetate and water; the aqueous phase is separated, and the organic phase extracted with 2-N hydrochloric acid. The free base is precipitated with concentrated ammonia from the acidified extract, and the crude base taken up in ethyl acetate. The ethyl acetate solution is washed with water, dried over sodium sulphate, and concentrated by evaporation. The residue is dissolved in 100 ml of dried methyl ethyl ketone; 15 ml of abs. ethanol are added; and the disulphate is carefully precipitated with conc. pure sulphuric acid. The obtained 1-[3-[4-(thieno[2,3-b][1,5]benzothiazepin-4-yl)-1-piperazinyl]-propyl]-3-butyl-2-imidazolidinone-disulphate melts at 232°–235°, with decomposition; yield 25.76 g, 95 percent of the theoretical value.

4-(1-piperazinyl)-thieno[2,3-b][1,5]benzothiazepine and 1-(3-chloropropyl)-3-butyl-2-imidazolidinone, which are required as starting materials, can be produced as follows:

*b.* To a solution of 10.0 g (0.0396 moles) of 4-chlorothieno[2,3-b][1,5]benzothiazepine in 10 ml of chloroform and 40 ml of benzene are added 19.5 g (0.123 moles) of 1-piperazinecarboxylic acid ethyl ester; and the solution is refluxed for 16 hours. The reaction mixture is then concentrated in vacuo, the crude free base precipitated with 20 ml of conc. ammonia, 100 ml of water are added, and the base is extracted with ether. The ether solution is washed with water until neutral; it is then dried over sodium hydroxide, concentrated by evaporation, and the residue recrystallized from ethanol. The obtained pure 4-(thieno[2,3-b][1,5]benzothiazepin-4-yl)-piperazine-1-carboxylic acid ethyl ester melts at 155°–156°.

The same compound may be obtained by the following procedure:

A mixture of 10.5 g (0.04 mol) of 4-methylthio-thieno-[2,3-b][1,5]benzothiazepin and 44.0 g (0.28 mols) of 1-piperazine carboxylic acid ethyl ester are heated to 150° – 160° during 24 hours. The reaction mixture is then extracted with water and benzene; whilst the aqueous phase is discarded the organic layer is washed four times with water and dried over magnesium sulphate, filtered with charcoal and evaporated to dryness. The residue is recrystallized from ether/petrolether, whereby 4-(thieno[2,3-b][1,5]benzothiazepin-4-yl)-piperazine-1-carboxylic acid ethyl ester is obtained, M.P. 115° – 156°. Yield, 8.0 g = 57 percent of the theoretical value.

The preparation of 4-(methylthio-thieno[2,3-b][1,5]benzothiazepin required as starting material is described in Example 1 b) to d).

*c.* 6.5 g (0.0174 moles) of the carboxylic acid ester obtained according to b) are dissolved in 70 ml of abs. ethanol; to the solution are added 8.0 g (0.15 moles) of potassium hydroxide, and the mixture is refluxed for 16 hours. The reaction solution is cooled, and concentrated in vacuo; water is added to the residue, and the base taken up in ether. The ether solution is washed with water until neutral, dried over sodium hydroxide, and concentrated by evaporation. The residue is recrystallized from benzene, whereupon is obtained the pure 4-(1-piperazinyl)-thieno[2,3-b][1,5]benzothiazepine, which melts at 131°–132.5°. The free base is converted into the fumarate, M.P. 204°–206°.

*d.* 19.6 g (0.175 moles) of 2-butylaminoethanol are dissolved in 30 ml of abs. methylene chloride. To this solution is added dropwise at −5° to 0°, in the course of 45 minutes, a solution of 20.9 g (0.175 moles) of (3-chloropropyl)-isocyanate in 20 ml of abs. methylene chloride. The reaction mixture is stirred for 2 hours at 30°, and then cooled to 0°. To the cooled solution containing the crude 1-butyl-1-(2-hydroxyethyl)-3-(3-chloropropyl)-urea is added dropwise, in the course of 30 minutes, a solution of 21.9 g (0.182 moles) of thionyl chloride in 20 ml of abs. methylene chloride. The reaction mixture is afterwards refluxed for 4 hours and concentrated in vacuo. The obtained residue: the crude 1-butyl-1-(-chloroethyl)-3-(3-chloropropyl)-urea, is dried under high-vacuum at 70°–80°; it is then heated for 3 hours in a bath at 120°, and then for 6 hours in a bath at 140°. The obtained crude 1-(3-chloropropyl)-3-butyl-2-imidazolidinone is distilled under high-vacuum, B.P. 110°–112°/0.05 Torr.

EXAMPLE 2

Analogously to Example 1 *a*) are obtained the following final products:

*a.* from 10.0 g (0.0332 moles) of 4-(1-piperazinyl)-thieno[2,3-b][1,5]benzothiazepin and 5.9 g (0.033 moles) of 1-(3-chloropropyl)-3-methyl-2-imidazolidinone is obtained 1-[3-[4-(thieno-[2,3-b][1,5]benzothiazepin-4-yl)-1-piperazinyl]-propyl]-3-methyl-2-imidazolidinone, which is converted with ethereal hydrochloric acid into the hygroscopic dihydrochloride, M.P. 232°–237°; yield 10.8 g, 61.8 percent of the theoretical value.

*b.* from 12.0 g (0.040 moles) of 4-(1-piperazinyl)-thieno[2,3][1,5]benzothiazepine and 8.2 g (0.041 moles) of 1-(2-chloroethyl)-3-butyl-2-imidazolidinone is obtained 1-[2-[4-(thieno[2;3-b][1,5]benzothiazepin-4-yl)-1-piperazinyl]-ethyl]-3-butyl-2-imidazolidinone; M.P. 104°–107° (from cyclohexane/ether); yield 9.6 g, 51 percent of the theoretical value; M.P. of the dihydrochloride 238°–242°, with decomposition.

EXAMPLE 3

*a.* Analogously to Example 1 *a*) are further obtained the following:

from 10.0 g (0.0332 moles) of 4-(1-piperazinyl)-thieno [2,3-b][1,5]benzothiazepin and 5.9 g (0.0334 moles) of 1-(2-chloroethyl)-3-ethyl-2-imidazolidinone is obtained: 1-[2-[4-(thieno[2,3-b][1,5]benzothiazepin-4-yl)-1-piperazinyl]-ethyl]-3-ethyl-2-imidazolidinone, M.P. 134°–136° (from acetonitrile); yield 11.6 g, 79.5 percent of the theoretical value; M.P. of the dihydrochloride 266°–267°.

The 1-(2-chloroethyl)-3-ethyl-2-imidazolidinone required as starting material is produced as follows:

b. An amount of 105.1 g (1.0 mole) of freshly distilled diethanolamine is dissolved in 1000 ml of abs. methylene chloride. To this solution is added dropwise at 10°, in the course of one hour, 73.1 g (1.03 moles) of ethylisocyanate dissolved in 200 ml of abs. methylene chloride. The reaction mixture is refluxed for 150 minutes; it is then cooled to 0° and, in the course of one hour, a solution of 250 g (2.1 moles) of thionyl chloride in 250 ml of abs. methylene chloride is added dropwise. The reaction mixture is then refluxed for 4 hours; it is afterwards concentrated in vacuo, and the residue: the crude 1-ethyl-3,3-bis-(2-chloroethyl)-urea, is dried for 8 hours at 70°-80° under high-vacuum.

c. An amount of 217.0 g (1.02 moles) of crude 1-ethyl-3,3-bis-(2-chloroethyl)-urea are dissolved in 200 ml of ethylene glycol dimethyl ether. To this solution is added dropwise at 50°, whilst thorough stirring is maintained, a suspension of 27.0 g (1.12 moles) of sodium hydride in 400 ml of abs. benzene. The reaction mixture is refluxed, whilst stirring proceeds, for 8 hours; it is afterwards cooled, and filtered through Celit 545 (trade-name of the Johns Manville International Corp., New York). The filter residue is extracted twice with warm benzene. The combined filtrates are concentrated in vacuo, and the oily residue is distilled in high-vacuum. The obtained pure 1-(2-chloroethyl)-3-ethyl-2-imidazolidinone boils at 80°/0.001 Torr ($n_D^{20°}$: 1.4921).

EXAMPLE 4

A solution of 17 g (0.067 moles) of 4-chlorothieno[2,3-b][1,5]benzothiazepine in 100 ml of abs. benzene is added dropwise, with stirring and cooling, to a solution of 14.0 g (0.14 moles) of triethylamine and 15.5 g (0.073 moles) of 1-[2-(1-piperazinyl)-ethyl]-3-methyl-2-imidazolidinone in 100 ml of abs. benzene. The reaction mixture is refluxed for 24 hours; it is then cooled, and to the mixture are added water and benzene. The organic phase is separated, and exhaustively extracted with 2-N hydrochloric acid. The pH-value of the aqueous phase is adjusted with conc. ammonia to ca. 10, and the precipitated crude base is shaken out with ethyl acetate. The organic extract is well washed with water, dried over sodium sulphate, and concentrated in vacuo. The residue is recrystallized from benzene/petroleum ether, whereupon 20 g (70 percent of the theoretical value) of 1-[2-[4-thieno[2,3-b][1,5]benzothiazepin-4-yl]-1-piperazinyl]-ethyl]-3-methyl-2-imidazolidinone, M.P. 131°, are obtained.

The obtained base is dissolved in warm dry acetone, and to the solution is added abs. ethanolic hydrochloric acid until an acid reaction to a congo indicator is obtained; M.P. of the dihydrochloride: 260° (with decomposition).

EXAMPLE 5 a. A suspension of 15.4 g (0.053 moles) of 2,4-dichlorothieno[2,3-b][1,5]benzothiazepine in 70 ml of abs. chloroform is added dropwise, with stirring and cooling, to a solution of 6.0 g (0.059 moles) of triethylamine and 11.6 g (0.055 moles) of 1-[2-(1-piperazinyl)-ethyl]-3-methyl-2-imidazolidinone in 60 ml of abs. benzene; and the reaction mixture is then refluxed for 20 hours. It is then diluted with benzene and water. The organic phase is separated, and extracted with 2-N hydrochloric acid. The pH-value of the extract is adjusted with conc. ammonia to 10, and the precipitated base is shaken out with ethyl acetate. The ethyl acetate solution is clarified through charcoal and Hyflo (purified diatomeceous earth), dried with sodium sulphate, and concentrated in vacuo. The residue is recrystallized from acetonitrile; and 7.4 g (30.2 percent of the theoretical value) of 1-[2-[4-(2-chlorothieno[2,3b][1,5]benzothiazepin-4-yl)-1-piperazinyl]-ethyl]-3-methyl-2-imidazolidinone, M.P. 146°-150°, are obtained. The obtained base is dissolved in warm anhydrous methyl ethyl ketone; and to the solution is added ethanolic hydrochloric acid until an acid reaction to a congo-indicator is obtained. The obtained dihydrochloride melts at 195°-197° (with decomposition).

The 2,4-dichlorothieno[2,3-b][1,5]benzothiazepine required as starting material is produced as follows:

b. An amount of 15.1 g (0.10 mole) of 2-chloro-5-mercaptothiophene [cp. E. Jones, and I.M. Moodie, Tetrahedron 21, 1333 (1965)] is dissolved in 70 ml of ethanol; to the solution are then added 17.0 g (0.10 mole) of 1-chloro-2-nitrobenzene. To this solution is added dropwise at 20°-25°, within 20 minutes, with stirring and cooling, a solution of 4.0 g (0.10 mole) of sodium hydroxide in 30 ml of ethanol. The reaction mixture is then refluxed for 4 hours, cooled, and concentrated in vacuo. The residue is taken up in ether and water, the aqueous phase is separated, the ether solution dried over calcium chloride, and concentrated by evaporation. The residue: a light-orange oil, is purified by elution chromatography on silica gel (Merck, grain size 0.05 - 0.20 mm). Concentration by evaporation of the fraction benzene/petroleum ether (1:9) yields the crude product, which is recrystallized from petroleum ether. The obtained pure 2-(o-nitrophenylthio)-5-chlorothiophene melts at 71.8° - 73°.

c. An amount of 85.5 g (0.31 moles) of the nitro compound obtained according to b) is dissolved at 40° in 200 ml of ethanol; this solution is added dropwise within 2 hours, with thorough stirring, to a boiling mixture of 91.0 g (1.62 moles) of ground cast-iron, 900 ml of water and 18 ml of conc. hydrochloric acid. The reaction mixture is boiled for a further 3 hours; it is then cooled to 20°, and made alkaline with 20 ml of concentrated sodium hydroxide solution. A precipitate is thereby obtained which is washed with water as well as with ether. The aqueous phase of the filtrate is separated from the ethereal solution, and the ethanol is evaporated off in vacuo from the aqueous phase. The aqueous residue is then extracted with the separated ethereal solution, the extract dried over calcium chloride, and concentrated by evaporation. The residue is distilled under high-vacuum, whereupon the pure 2-(o-aminophenylthio)-5-chloro-thiophene is obtained, B.P. 132°-136°/0.003 Torr.

d. An amount of 80 g (0.81 moles) of phosgene is dissolved in 400 ml of abs. toluene at 0°; to this solution is then added dropwise within one hour at the same temperature, with stirring and introduction of phosgene, a mixture of 30.5 g (0.12 moles) of 2-(o-aminophenylthio)-5-chlorothiophene and 100 ml of toluene. The reaction mixture is refluxed for 30 minutes with the continued introduction of phosgene, whereby this dissolves. The solution is then cooled whilst anhydrous nitrogen is passed through; the solution is afterwards concentrated in vacuo at 40°. The residue: crude 2-(o-isocyanatophenylthio)-5-chlorothiophene, dissolved in 30 ml of 1,1,2,2-tetrachloroethane is added dropwise at −15° to a suspension of 16.3 g of aluminum chloride in 80 ml of 1,1,2,2-tetrachloroethane. The suspension is heated within one hour to room temperature, and this temperature is maintained, whilst stirring proceeds, for a further 21 hours. The reaction mixture is then poured on to 200 g of ice in 50 ml of concentrated hydrochloric acid, and the precipitate filtered off under suction. The precipitate is washed with ether, and dried at 100° in vacuo; it is recrystallized from dioxane, whereupon the pure 2-chlorothieno[2,3-b][1,5]benzothiazepin-4(5H)-one melts at 266°–268°.

e. An amount of 7.0 g (0.02 moles) of the obtained lactam is suspended in 80 ml of abs. toluene; to the suspension are added 6.7 g (0.05 moles) of powdered phosphorus pentachloride, and the mixture is heated for 30 minutes, whilst being stirred, to 60°. The obtained yellow suspension is concentrated by evaporation at 60°, and the residue: 2,4-dichlorothieno[2,3-b][1,5]benzothiazepine, is used as crude product.

EXAMPLE 6

Analogously to Example 5 a) is obtained, from 15.0 g (0.033 moles) of 2,4-dichlorothieno[2,3-b][1,5]benzothiazepine and 22.0 g (0.082 moles) of 1-[3-(1-piperazinyl)-propyl]-3-butyl-2-imidazolidinone, 1-[3-[4-(2-chlorothieno]2,3-b][1,5]benzothiazepin-4-yl)-1-piperazinyl]-propyl]-3-butyl-2-imidazolidinone. The crude base is dissolved in abs. ethanol, and concentrated sulphuric acid is added, with stirring, until an acid reaction to a congo-red indicator is obtained. The crude disulphate is obtained which is recrystallized from methanol/water; M.P. of the pure disulphate: 246°–249°, with decomposition; yield 16.0 g, 68 percent of the theoretical value.

EXAMPLE 7 a. 3.01 g (0.010 mole) of 4-[1-piperazinyl)-thieno[2,3-b][1,5]benzothiazepine are refluxed with 2.80 g (0.014 moles) of crude 1-methyl-3,3-bis-(2-chloroethyl)-urea and 3.6 g (0.026 moles) of anhydrous potassium carbonate in 36 ml of diethyl ketone for 12 hours. A further 2.4 g (0.018 moles) of potassium carbonate are added after 4 hours reaction time, and the same amount again after 8 hours reaction time. The reaction mixture is cooled, diluted with ether, filtered, and the filtrate concentrated in vacuo. The residue (5.35 g) is taken up in ether; the solution is extracted with 1-N hydrochloric acid, the acidified extract washed with ether, and excess sodium carbonate is added. The precipitated free base is taken up in ether, the ether solution washed with water, dried over sodium sulphate, and concentrated by evaporation. The residue is chromatographed on a column of silica gel (Merck, grain size 0.05 – 0.2 mm) which has been impregnated with 0.5-n sodium hydroxide solution. Chloroform is used as eluting agent. The fractions containing the crude product are concentrated by evaporation. The residue is recrystallized from benzene/petroleum ether, whereupon the pure 1-[2-[4-(thieno[2,3-b][1,5]benzothiazepin-4-yl)-1-piperazinyl]-ethyl]-3-methyl-2-imidazolidinone melts at 131°.

The starting compound: crude 1-methyl-3,3-bis-(2-chloroethyl)-urea is produced as follows:

b. 105.1 g (1.0 mole) of freshly distilled diethanol amine are dissolved in 1000 ml of abs. methylene chloride. To this solution are added dropwise at 10°, in the course of one hour, 59.0 g (1.03 moles) of methylisocyanate dissolved in 200 ml of abs. methylene chloride. The reaction mixture is refluxed for 150 minutes; it is then cooled to 0°, and to the solution of the formed 1-methyl-3,3-(2-hydroxyethyl)-urea is added dropwise, in the course of one hour, a solution of 250 g (2.1 moles) of thionyl chloride in 250 ml of abs. methylene chloride. The reaction mixture is then refluxed for 4 hours; it is afterwards concentrated in vacuo, and the residue: crude 1-methyl-3,3-bis-(2-chloroethyl)-urea, is dried for 8 hours at 70°–80° under high-vacuum.

EXAMPLE 8

Analogously to Example 1a) the following final products are obtained:

a. from 30.1 g (0.1 mol) of 4-(1-piperazinyl)-thieno[2,3-b][1,5]benzothiazepine and 16.2 g (0.1 mol) of 1-(2-chloroethyl)-3-methyl-2-imidazolidinone, the 1-[2-[4-(thieno[2,3-b][1,5]benzothiazepin-4-yl)-1-piperazinyl]-ethyl]-3-methyl-2-imidazolidinone, M.P. 131°; Yield 30.8 g = 72 percent of the theoretical value.

b. from 33.5 g (0.1 mol) of 2-chloro-4-(1-piperazinyl)-thieno[2,3-b][1,5]benzothiazepine and 16.2 g (0.1 mol) of 1-(2-chloroethyl)-3-methyl-2-imidazolidinone, the 1-[2-[4-(2-chloro-thieno[2,3-b][1,5]benzothiazepin-4-yl)-1-piperazinyl]-ethyl]-3-methyl-2-imidazolidinone, M.P. 146° – 150°; Yield 35.1 g = 70 percent of the theoretical value. The compound 2-chloro-4-(1-piperazinyl)-thieno[2,3-b][1,5]-benzothiazepine required as starting material is obtained analogously to Example 1b) and c) from crude 2,4-dichlorothieno[2,3-b][1,5]benzothiazepine.

EXAMPLE 9

Analogously to Example 7a) the following final products are obtained:

a. from 30.1 g (0.1 mol) of 4-(1-piperazinyl)-thieno[2,3-b][1,5]benzothiazepine and 28.9 g (0.12 mols) of 1-butyl-3,3-bis-(2-chloroethyl)-urea, the 1-[2-[4-(thieno-[2,3-b][1,5]benzothiazepin-4-yl)-1-piperazinyl]-ethyl]-3-butyl-2-imidazolidinone, M.P. 104° – 107°; M.P. (dihydrochloride) 238° – 242°. Yield 24.4 g = 52 percent of the theoretical value calculated on the free base.

b. The 1-butyl-3,3-bis-(2-chloroethyl)-urea is prepared analogously to Example 7b):

From 99.1 g (1 mol) of butylisocyanate and 105.1 g (1mol) of diethanolamine, the crude 1-butyl-3,3-bis-(2-hydroxyethyl)-urea is obtained, which is reacted with 250 g (2.1 mols) of thionylchloride to the 1-butyl-3,3-bis-(2-chloroethyl)-urea, which is used for the following reaction in crude state. Yield = quantitative.

c. from 30.1 g (0.1 mol) of 4-(1-piperazinyl)-thieno[2,3-b][1,5]benzothiazepine and 25.6 g (0.12 mols) of 1-ethyl-3,3-bis-(2-chloroethyl)-urea, the 1-[2-[4- thieno-[2,3-b][1,5]benzothiazepin-4-yl)-1-piperazinyl]-ethyl]-3-ethyl-2-imidazolidinone. M.P. 134° – 136°; Yield: 24.8 g = 56 percent of the theoretical value.

The crude 1-ethyl-3,3-bis-(2-chloroethyl)-urea required as starting material is prepared analogously to Example 7b) from 71.1 g (1 mol) of ethylisocyanate, 105 g (1 mol) of diethanolamine and 250 g (2.1 mols) of thionylchloride.

d. from 33.5 g (0.1 mol) of 2-chloro-4-(1-piperazinyl)-thieno[2,3-b][1,5]benzothiazepine and 24.9 g (0.12 mol) of 1-methyl-3,3-bis-(2-chloroethyl)-urea, the 1-[2-[4-(2-chlorothieno[2,3-b][1,5]benzothiazepin-4-yl)-1-piperazinyl]-ethyl]-3-methyl-2-imidazolidinone. M.P. 146° – 150°.

EXAMPLE 10

Analogously to Example 4, the following final products are obtained:

a. from 25.1 g (0.1 mol) of 4-chloro-thieno[2,3-b][1,5]-benzothiazepine and 45.2 g (0.2 mols) of 1-[3-(1-piperazinyl)-propyl]-3-methyl-2-imidazolidinone, the 1-[3-[4-(thieno[2,3-b][1,5]benzothiazepin-4-yl)-1-piperazinyl]-propyl]-3-methyl-2-imidazolidinone. M.P. 87° – 94°. Yield: 35.4 g = 80% of the theoretical value.

b. from 25.1 g (0.1 mol) of 4-chloro-thieno[2,3-b][1,5]benzothiazepine and 50.8 g (0.2 mols) of 1-[2-(1-piperazinyl)-ethyl]-3-butyl-2-imidazolidinone, the 1-[2-[4-(thieno[2,3-b][1,5]benzothiazepin-4-yl)-1-piperazinyl]-ethyl]-3-butyl-2-imidazolidinone. M.P. 104° – 107°; Yield 39.0 = 83 percent of the theoretical value.

c. from 25.1 g (0.1 mol) of 4-chloro-thieno[2,3-b][1,5]-benzothiazepine and 53.6 g (0.2 mols) of 1-[3-(1-piperazinyl)-propyl]-3-butyl-2-imidazolidinone, the 1-[3-[4-(thieno-[2,3-b][1,5]benzothiazepin-4-yl)-1-piperazinyl]-propyl]-3-butyl-2-imidazolidinone. M.P. (disulphate) 233° – 235°. The 1-[3-(1-piperazinyl)-propyl]-3-butyl-2-imidazolidinone required as starting material is prepared as follows:

d. 218.0 g (1 mol) of 1-[3-chloropropyl]-3-butyl-2-imidazolidinone and 175.0 g (1.1 mols) of 1-piperazine-carboxylic acid ethyl ester are dissolved in 1000 ml of diethylketone, 304.0 g (2.0 mols) of potassium carbonate are added and the mixture is refluxed for 24 hours. The reaction mixture is filtered hot, the residue is boiled twice, each time with 300 ml of chloroform and filtered.

The combined filtrates are evaporated in vacuo to dryness and the oily residue is fractionated in a high-vacuum, whereby the pure 1-[3-(4-ethoxycarbonyl-1-piperazinyl)-propyl]-3-butyl-2-imidazolidinone distills at 180° – 210°/0.001 Torr; $n_D^{24}$ = 1.4969.

e. A solution of 340.0 g (1 mol) of 1-[3-(4-ethoxycarbonyl-1-piperazinyl)-propyl]-3-butyl-2-imidazolidinone and 300.0 g (5.35 mols) of potassium hydroxide in 1500 ml of absolute ethanol is refluxed for 16 hours. The precipitate is filtered off and washed with warm ethanol. The combined filtrates are evaporated to dryness and the residue is dissolved in 1000 ml of benzene and 300 ml of water. The aqueous phase is separated, saturated with solid potassium carbonate and extracted four times with benzene. The combined benzene-solutions are dried over potassium carbonate and evaporated to dryness in vacuo. The residue is fractionated in a high-vacuum, whereby the pure 1-[3-(1-piperazinyl)-propyl]-3-butyl-2-imidazolidinone distills at 145° – 160°/0.01 Torr; $n_D^{24}$ = 1.5006.

EXAMPLE 11 a. A mixture of 12.0 g (0.045 mols) of 4-methylthiothieno[2,3][1,5]benzothiazepine and 38.0 g (0.18 mols) of 1-[2-(1-piperazinyl)-ethyl]-3-methyl-2-imidazolidinone is heated at 150° – 160° for 30 hours. The reaction mixture is poured into water, rendered strongly alkaline by means of 2-n sodium hydroxide solution and extracted with benzene. The benzene phase is washed three times with water and extracted with 2-N hydrochloric acid. The acid aqueous phases are rendered alkaline by means of sodium hydroxide solution and extracted with benzene. The benzene solution is washed with water, dried over magnesium sulphate and filtered with charcoal. The clear filtrate is evaporated to dryness in vacuo and the residue is recrystallized from a small amount of benzene and then from ether/petrolether, whereby the pure 1-[2-[4-(thieno[2,3-b][1,5]benzothiazepin-4-yl)-1-piperazinyl]-ethyl]-3-methyl-2-imidazolidinone is obtained. M.P. 131°; Yield: 12.0 g = 63 percent of the theoretical value.

The compound 4-methylthio-thieno[2,3-b][1,5]benzothiazepine required as starting material is prepared in the following manner:

b. 57.8 g (0.28 mols) of o-(thienylthio)-aniline are dissolved in 950 ml of absolute toluene. To this solution a mixture of 38.6 g (0.336 mols) of thiophosgene in 150 ml of absolute toluene is dropped in the course of 15 minutes, whereby a thick suspension results, which is refluxed for 4 hours. The resulting clear yellow solution is evaporated in vacuo and the oily residue is fractionated in a high vacuum. The pure o-(2-thienylthio)-phenylisocyanate distills at 135° – 138°/0.001 Torr. Yield: 62.4 g = 89.5 g of the theoretical value.

c. 62.4 g (0.25 mols) of the compound thus obtained are dissolved in 250 ml of 1,1,2,2-tetrachloroethane which solution is then added in the course of 60 minutes at −10° to −5°, to a solution of 36.7 g (0.275 mols) of aluminum trichloride in 350 ml of 1,1,2,2-tetrachloroethane. The dark green reaction mixture is stirred for 24 hours at 0° and warmed up in the course of one hour at ambient temperature. The solution is poured into 1 liter of ice water and the organic solvent removed by steam distillation. The remaining suspension is filtered and the residue is washed with water until neutral reaction and dried. The dry compound is dissolved in 2 liters of a benzene: chloroform (2:1) mixture, filtered with charcoal and the clear filtrate evaporated to a volume of ca. 100 ml. The precipitate is filtered off, washed with ether and dried in vacuo, whereby the pure thieno[2,3-b][1,5] benzothiazepin-4(5H)-thione is obtained. M.P. 206° – 208°; Yield 51.2 g = 83 percent of the theoretical value.

d. 8.75 g (0.035 mols) of thieno[2,3-b][1,5] benzothiazepin-4(5H)-thione and 14.5 g (0.105 mole) of finely powdered potassium carbonate are suspended in 150 ml of acetone and 5.95 g (0.042 g mol) of methyliodide are dropped into the suspension in the course of 15 minutes at ambient temperature. The mixture is stirred for 5 hours at ambient temperature and filtered, the residue is washed with acetone and the combined filtrates evaporated to dryness. The oily residue is dissolved in ether, shaken with 2-n sodium hydroxide solution, followed by washing with water until neutral. The organic layer is dried over magnesium sulphate, filtered with charcoal and the solvent evaporated in vacuo. The residue is recrystallized from a small amount of ether-pentane mixture, whereby the pure 4-methylthiothieno[2,3-b][1,5]benzothiazepine is obtained. M.P. 67° – 69°; Yield 8.7 g = 95 percent of the theoretical value.

EXAMPLE 12

Analogously to Example 11a) is prepared:

a. from 26.3 g (0.1 mol) of 4-methylthio-thieno[2,3-b]-[1,5]benzothiazepine and 102 g (0.4 mol) of 1-[2-[1-(piper-azinyl)-ethyl]-3-butyl-2-imidazolidinone, the 1-[2-[4-(thieno[2,3-b][1,5]benzothiazepin-4-yl)-1-piperazinyl]-ethyl]-3-butyl-2-imidazolidinone. M.P. 104° – 107°.

b. from 26.3 g (0.1 mol) of 4-methylthio-thieno[2,3-b]-[1,5]benzothiazepine and 90.5 g (0.4 mol) of 1-[3-(1-piper-azinyl)-propyl]-3-methyl-2-imidazolidinone, the 1-[3-[4-(thieno[2,3-b][1,5]benzothiazepin-4-yl)-1-piperazinyl]-propyl]-3-methyl-2-imidazolidinone. M.P. 87° – 94°.

c. from 26.3 g (0.1 mol) of 4-methylthio-thieno[2,3-b]-[1,5]benzothiazapine and 107 g (0.4 mol) of 1-[3-(1-piper-azinyl)-propyl]-3-butyl-2-imidazolidinone, the 1-[3-[4-(thieno[2,3-b][1,5]benzothiazepin-4-yl)-1-piperazinyl]-propyl]-3-butyl-2-imidazolidinone, the disulphate of which melts at 233° – 235° (from methyl-ethyl ketone and a small amount of ethanol).

d. from 29.7 g (0.1 mol) of 2-chloro-4-methylthiothieno[2,3-b][1,5]benzothiazepine and 107 g (0.4 mol) of 1-[3-(1-piperazinyl)-propyl]-3-butyl-2-imidazolidinone, the 1-[3-[4-(2-chloro-thieno[2,3-b][1,5]benzothiazepin-4-yl)-1-piperazinyl]-propyl]-3-butyl-2-imidazolidinone, the disulphate of which melts at 247° – 249° (precipitated from ethanol, followed by recrystallization from methanol-water). The 2-chloro-4-methylthio-thieno[2,3-b][1,5]-benzothiazepine required as starting material is prepared analogously to Example 11b) – d) from 2-chloro-thienylthio-aniline.

What is claimed is:

1. A compound of the formula I,

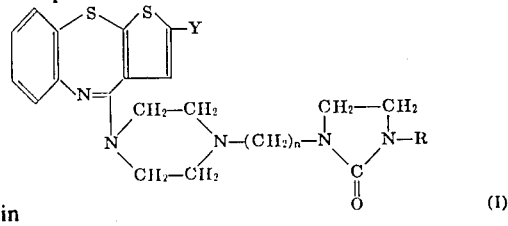

wherein

R is lower alkyl having one to four carbon atoms;

n is the integer 2 or 3; and

Y is hydrogen or chloro;

and the pharmaceutically acceptable acid addition salts thereof.

2. A compound according to claim 1, which is 1-[2-[4-(thieno[2,3-b][1,5]benzothiazepin-4-yl)-1-piperazinyl]-ethyl]-3-methyl-2-imidazolidinone or a pharmaceutically acceptable acid addition salt thereof.

* * * * *